(12) United States Patent
Okutani et al.

(10) Patent No.: US 12,058,165 B2
(45) Date of Patent: Aug. 6, 2024

(54) STORAGE SYSTEM, COUPLING PRIORITY DETERMINATION METHOD, AND RECORDING MEDIUM

(71) Applicant: Hitachi, Ltd., Tokyo (JP)

(72) Inventors: Ryo Okutani, Tokyo (JP); Hajime Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 17/698,995

(22) Filed: Mar. 18, 2022

(65) Prior Publication Data

US 2022/0417276 A1 Dec. 29, 2022

(30) Foreign Application Priority Data

Jun. 24, 2021 (JP) ................................ 2021-105145

(51) Int. Cl.
*G06F 15/16* (2006.01)
*H04L 9/40* (2022.01)
*H04L 67/1097* (2022.01)

(52) U.S. Cl.
CPC .......... *H04L 63/1433* (2013.01); *H04L 63/20* (2013.01); *H04L 67/1097* (2013.01)

(58) Field of Classification Search
CPC . H04L 63/1433; H04L 63/20; H04L 63/0435; H04L 67/1097
See application file for complete search history.

(56) References Cited

U.S. PATENT DOCUMENTS

| 2004/0003251 | A1* | 1/2004 | Narin | H04L 63/0823 713/172 |
| 2009/0144541 | A1* | 6/2009 | Kim | H04L 9/321 717/178 |
| 2014/0189063 | A1* | 7/2014 | Carriero | H04L 67/306 709/219 |
| 2014/0230024 | A1* | 8/2014 | Uehara | H04L 63/1433 726/4 |
| 2021/0042795 | A1* | 2/2021 | Batkin | H04L 67/02 |

FOREIGN PATENT DOCUMENTS

| CN | 1764195 A | * | 4/2006 |
| CN | 113485825 A | * | 10/2021 |
| JP | 2010-097499 A | | 4/2010 |

* cited by examiner

*Primary Examiner* — Richard G Keehn
(74) *Attorney, Agent, or Firm* — Procopio, Cory, Hargreaves & Savitch LLP

(57) ABSTRACT

A storage system that determines coupling priority of a plurality of coupling candidate servers includes a control unit. The control unit is configured to acquire information on security strength from the coupling candidate servers, determine coupling priority of the respective coupling candidate servers on a basis of the security strength of the coupling candidate servers and processing speed performance in processing relating to security with the coupling candidate servers, and cause the determined coupling priority of the coupling candidate servers to be stored in a prescribed memory.

9 Claims, 7 Drawing Sheets

FIG. 2

Coupling candidate server information table 31

| Member | Description | Example |
|---|---|---|
| IP address or host name | IP address or host name of coupling candidate server | 10.164.133.111 |
| Usable security configuration ID list | List of IDs for security configuration usable by coupling candidate server | 1,2,5··· |
| Evaluation value | Evaluation value of coupling candidate server | 11.5 |
| Response time (for N times) | Response times for N times | 1,2,1,3,1.5,2,0.5··· |
| Response time median | median of response times | 1 |
| Coupling priority | Coupling priority | 2 |

FIG. 3

Security configuration table 32

| Member | Description | Example |
|---|---|---|
| Security configuration ID | ID of encryption algorithm | 2 |
| Security configuration name | Name of security configuration | TLS_ECDHE_RSA_WITH_AES_256_GCM_SHA384 |
| Security strength score | Score (defined in advance) of corresponding algorithm in terms of security | 7 |
| Processing speed performance score | Score (defined in advance) of corresponding algorithm in terms of processing speed performance | 2 |

FIG. 4

Mode table 33

| Member | Description | Example |
|---|---|---|
| Mode name | Mode selected in advance by client | Any of security priority mode, processing speed priority mode, and balance mode |

# STORAGE SYSTEM, COUPLING PRIORITY DETERMINATION METHOD, AND RECORDING MEDIUM

CROSS-REFERENCE TO PRIOR APPLICATION

This application relates to and claims the benefit of priority from Japanese Patent Application No. 2021-105145 filed on Jun. 24, 2021, the entire disclosure of which is incorporated herein by reference.

BACKGROUND

The present disclosure relates to a technology to determine coupling priority for a plurality of coupling candidate servers.

In a computer system including a storage system, various kinds of servers are provided, and the storage system and the various servers transmit and receive various information to and from each other through encryption communication. Some such computer systems include a plurality of servers capable of performing the processing of the same kind in terms of redundancy.

When selecting a server to be actually coupled from among a plurality of servers capable of performing the processing of the same kind, a storage system searches for a couplable server according to priority defined in advance by a user. When the couplable server exists, the storage system performs communication with the server and does not perform communication with other servers. Therefore, even if any other server having higher security strength than that of the server determined according to the priority exists, the server is not coupled to the storage system.

Therefore, if priority was falsely set by the user or a security configuration on the server side was not properly made, the storage system performs communication with a server having an insufficient security configuration, which results in a possibility that a security risk is caused.

On the other hand, Japanese Patent Application Publication No. 2010-97499 discloses a technology to select a security management server having the highest security level from among usable security management servers and use the same.

SUMMARY

According to the technology disclosed in Japanese Patent Application Publication No. 2010-97499, it is possible to select a server having a high security level.

However, when a server having a high security level is selected, a load for performing processing relating to security is increased, which results in a possibility that the performance of a storage system is reduced. Therefore, a server having a high security level is not always an appropriate coupling destination.

The present disclosure has been made in view of the above circumstances and has an object of providing a technology with which it is possible to select an appropriate server as a coupling destination from among a plurality of servers.

In order to achieve the above object, a storage system according to an aspect is a storage system that determines coupling priority for a plurality of coupling candidate servers. The storage system includes a processor. The processor is configured to acquire information on security strength from the coupling candidate servers, determine coupling priority of the respective coupling candidate servers on a basis of the security strength of the coupling candidate servers and performance of processing speed in processing relating to security with the coupling candidate servers, and cause the determined coupling priority of the coupling candidate servers to be stored in a prescribed storage device.

BRIEF DESCRIPTION OF THE DRAWINGS

FIG. 2 is a configuration diagram of a coupling candidate server information table according to an embodiment;
FIG. 3 is a configuration diagram of a security configuration table according to an embodiment;
FIG. 4 is a configuration diagram of a mode table according to an embodiment.

DETAILED DESCRIPTION

Embodiments will be described with reference to the drawings. Note that the following embodiments do not intend to limit the invention according to claims, and various elements described in the embodiments and all the combinations of the elements are not always essential for the solving means of the invention.

Hereinafter, information will be described by an expression such as an "AAA table" depending on circumstances. However, information may be expressed by any data structure. That is, an "AAA table" may be called "AAA information" to indicate that information does not depend on a data structure.

Further, processing will be hereinafter described using a program (module) as an operating subject depending on circumstances. Since a program (module) is performed by a processor (for example, a CPU (Central Processing Unit)) to perform prescribed processing appropriately using a storage resource (for example, a memory) and/or a communication interface device (for example, a communication port) or the like, the operating subject of the processing may be the processor. Processing in which a program serves as an operating subject may be processing performed by a processor or an apparatus having the processor.

Figure 1:
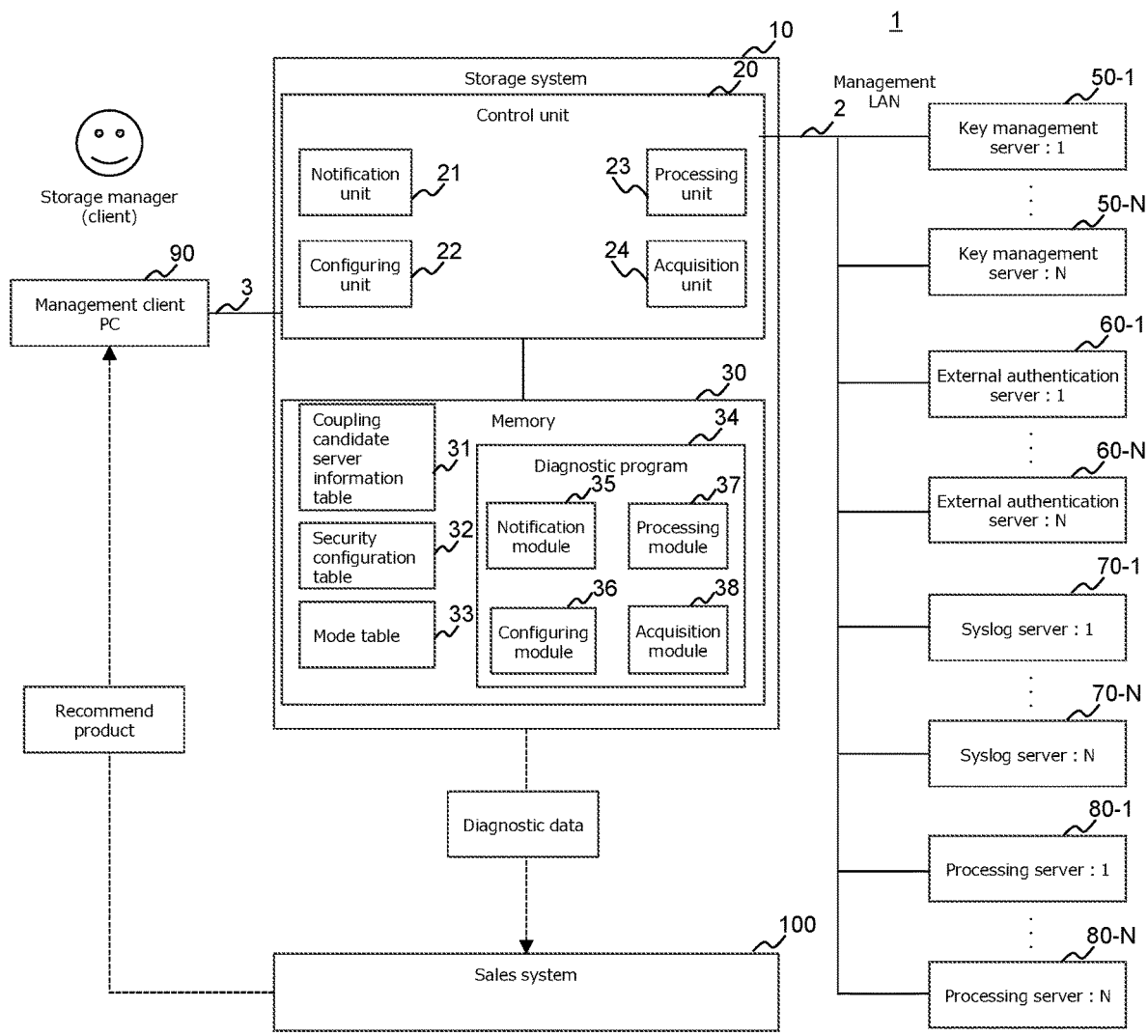
FIG. 1 is an entire configuration diagram of a computer system according to an embodiment.

FIG. 1 is an entire configuration diagram of a computer system according to an embodiment.

A computer system 1 includes a storage system 10, various servers (50-1, . . . , 50-N, 60-1, . . . , 60-N, 70-1, . . . , 70-N, 80-1, . . . , 80-N), a management client PC 90, and a sales system 100. The storage system 10 and the various servers are coupled to each other via a management LAN (Local Area Network) 2 that is an example of a network. Further, the storage system 10 and the management client PC 90 are coupled to each other via a management LAN 3 that is an example of a network. The sales system 100 is coupled to the storage system 10 and the management client PC 90 via a network not shown.

The various servers include key management servers 50 (50-1, . . . , 50-N), external authentication servers 60 (60-1, ..., 60-N), Syslog servers 70 (70-1, ..., 70-N), and processing servers 80 (80-1, ..., 80-N). Each of the various servers is an example of a coupling candidate server.

The key management server 50 performs processing to safely manage keys for encrypting data to be stored in the storage system 10. The external authentication server 60 performs processing relating to the authentication of a user using the storage system 10. The Syslog server 70 manage system logs in the storage system 10. The processing server 80 perform prescribed processing. The processing server 80 may be server constituting another storage system.

The management client PC 90 is constituted by, for example, a PC (Personal Computer) and used by a manager (also called a client or a user) of the storage system 10 to input information to the storage system 10 or display and output information from the storage system 10 or the sales system 100.

The sales system 100 is constituted by, for example, a PC, receives diagnostic data (for example, the information of security configurations on respective servers, evaluation values, the information of modes specified by a manager, or the like) from the storage system 10, and performs various processing on the basis of the diagnostic data. For example, the sales system 100 visualizes room for an improvement in security or performance in the computer system 1 and generates a system configuration plan capable of realizing the need of a manager and notifies the manager of the same. Further, the sales system 100 recommends a function to be added to the storage system. For example, the sales system 100 proposes a manager who has specified a security priority mode but has not purchased a function to encrypt data inside the storage system to purchase the function or purchase a storage system with enhanced security.

The storage system 10 is constituted by, for example, a computer such as a PC and a server apparatus and includes a control unit 20 and a memory 30. The control unit 20 is, for example, a processor and includes the function units of a notification unit 21, a configuring unit 22, a processing unit 23, and an acquisition unit 24. The control unit 20 performs a program stored in the memory 30 to realize the respective function units.

The memory 30 is an example of a storage device. The memory 30 is, for example, a RAM (Random Access Memory) and stores various programs that are to be performed by the control unit 20 or various information that is to be used by the control unit 20.

The memory 30 stores a coupling candidate server information table 31, a security configuration table 32, a mode table 33, and a diagnostic program 34.

The coupling candidate server information table 31 is a table that is provided for each server (coupling candidate server) that serves as a coupling candidate and manages the information of the corresponding coupling candidate server. The security configuration table 32 is a table that manages security strength for an encryption algorithm and the information of a processing speed for performing the encryption algorithm. The mode table 33 is a table that manages modes configured by a user. Note that the details of the respective tables will be described later.

The diagnostic program 34 is an example of a coupling priority determination program and has a notification module 35, a configurating module 36, a processing module 37, and an acquisition module 38. The notification unit 21 is configured by the control unit 20 executing the notification module 35. The configurating unit 22 is configured by the control unit 20 executing the configurating module 36. The processing unit 23 is configured by the control unit 20 executing the processing module 37. The acquisition unit 24 is configured by the control unit 20 executing the acquisition module 38.

The configurating module 36 receives the specification of various configurations (for example, the specification of a mode) from a user and configures with respect to the storage system 10. The processing module 37 performs processing such as the calculation of evaluation values relating to coupling priority for the respective servers, the acquisition of the response times of the respective servers, the calculation of the median of the response times, and the calculation of coupling priority for the respective servers. The notification module 35 notifies the user of an alert using an evaluation value when a server having a weak security configuration exists. The acquisition module 38 acquires the information of security configurations usable by the servers (for example, an encryption communication protocol or an encryption suite (an encryption algorithm for encryption communication)), or the like from the respective servers.

FIG. 2 is a configuration diagram of the coupling candidate server information table according to an embodiment.

The coupling candidate server information table 31 is provided for each of the coupling candidate servers and the coupling candidate server information tables 31 classified into groups of processing servers that perform the processing of the same kind, for example, a group of the key management servers 50, a group of the external authentication servers 60, and a group of the Syslog servers 70. The coupling candidate server information table 31 includes the members (items) of an IP address or a host name, a usable security configuration ID list, an evaluation value, a response time (for N times), a response time median, and coupling priority.

In the IP address or the host name, the IP address or the host name of a coupling candidate server corresponding to the coupling candidate server information table 31 is stored. In the usable security configuration ID list, a list of IDs for identifying a security configuration usable by the coupling candidate server is stored. In the evaluation value, an evaluation value for determining the coupling priority of the coupling candidate server is stored. Here, the stored evaluation value varies depending on a configured mode. In the response time (for N times), response times for N times in communication with the coupling candidate server are stored. In the response time median, the median of the response times for the N times is stored. In the coupling priority, the coupling priority of the coupling candidate server among a group of coupling candidate servers that perform the processing of the same kind is stored. In the case of, for example, the external authentication servers, in the coupling priority, the coupling priority of the coupling candidate server among a group of the external authentication servers is stored. Note that the coupling priority may be a value for determining a coupling order or may be a coupling order.

FIG. 3 is a configuration diagram of the security configuration table according to an embodiment.

In the security configuration table 32, an entry for each security configuration is stored. In the present embodiment, the security configuration table 32 manages a security configuration usable by the storage system 10. The entry of the security configuration table 32 includes the members of a security configuration ID, a security configuration name, a security strength score, and a processing speed performance score.

In the security configuration ID, the ID (security configuration ID) of a security configuration (encryption algorithm)

corresponding to the entry is stored. In the security configuration name, the name of the security configuration corresponding to the entry is stored. The name of the security configuration may be a combination of names such as a key exchange algorithm, a message encryption algorithm, an authentication algorithm, and a hash algorithm used for message authentication constituting the encryption algorithm. In the security strength score, a score (evaluation value: a security strength score or a security strength evaluation value) relating to security strength on the security configuration corresponding to the entry is stored. In the processing speed performance score, a score (evaluation value: a processing speed performance score or a processing speed performance evaluation value) relating to the processing speed performance of processing to perform security in the security configuration corresponding to the entry is stored. In the present embodiment, a score (reference value) common to the storage systems of other kinds is used as the processing speed performance score. The security strength score or the processing speed performance score is, for example, a value determined on the basis of information made open to the public by an organization such as NIST (National Institute of Standards and Technology).

FIG. 4 is a configuration diagram of the mode table according to an embodiment.

The mode table 33 manages a mode name configured by a user. Here, a mode is a security priority mode, a processing speed priority mode, or a balance mode. The security priority mode is a mode for determining coupling priority on the basis of a security strength score. The processing speed priority mode is a mode for determining coupling priority on the basis of a processing speed performance score. The balance mode is a mode for determining coupling priority on the basis of a security strength score and a processing speed performance score.

Next, the outline of priority calculation processing by the storage system 10 will be described.

Figure 5:
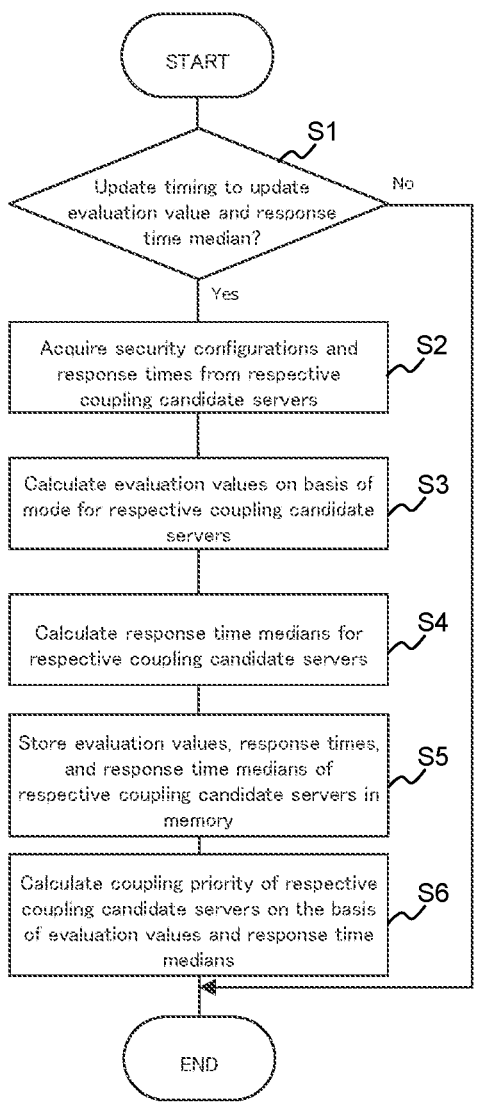
FIG. 5 is a flowchart showing the outline of priority calculation processing according to an embodiment.

FIG. 5 is a flowchart showing the outline of the priority calculation processing according to an embodiment.

First, the acquisition unit 24 of the storage system 10 determines whether an update timing to update the evaluation value and the response time median of a coupling target server has arrived (S1). The update timing may be, for example, a timing at which a prescribed time has elapsed since the last update timing. Alternatively, the update timing may be a timing at which a coupling candidate server has been added or deleted, a timing at which the security configuration of a coupling candidate server has been changed, a timing at which a security configuration (for example, an encryption algorithm) usable by the storage system 10 has been changed, or the like.

If the update timing has not arrived (No in step S1), the acquisition unit 24 ends the processing.

On the other hand, if the update timing has arrived (Yes in step S1), the acquisition unit 24 acquires security configurations from respective configuration candidate servers, the processing unit 23 measures the response times of the respective coupling candidate servers, and the acquisition unit 24 stores the acquired security configurations in the coupling candidate server information tables 31 (step S2).

Next, the processing unit 23 calculates evaluation values used for determining coupling priority on the basis of a configured mode for the respective coupling candidate servers (step S3).

Next, the processing unit 23 refers to the respective coupling candidate server information tables 31, calculates the response time medians of the respective coupling candidate servers (step S4), and stores the evaluation values, the response times, and the response time medians of the respective coupling candidate servers in the coupling candidate server information tables 31 of the memory 30 (step S5).

Next, the processing unit 23 calculates the coupling priority of the respective coupling candidate servers on the basis of the evaluation values and the response time medians (step S6). Note that the processing unit 23 determines, for each group of the coupling candidate servers that perform the processing of the same kind, the coupling priority of the coupling candidate servers in the group in the present embodiment.

Next, the priority calculation processing by the storage system 10 will be described in detail.

Figure 6:
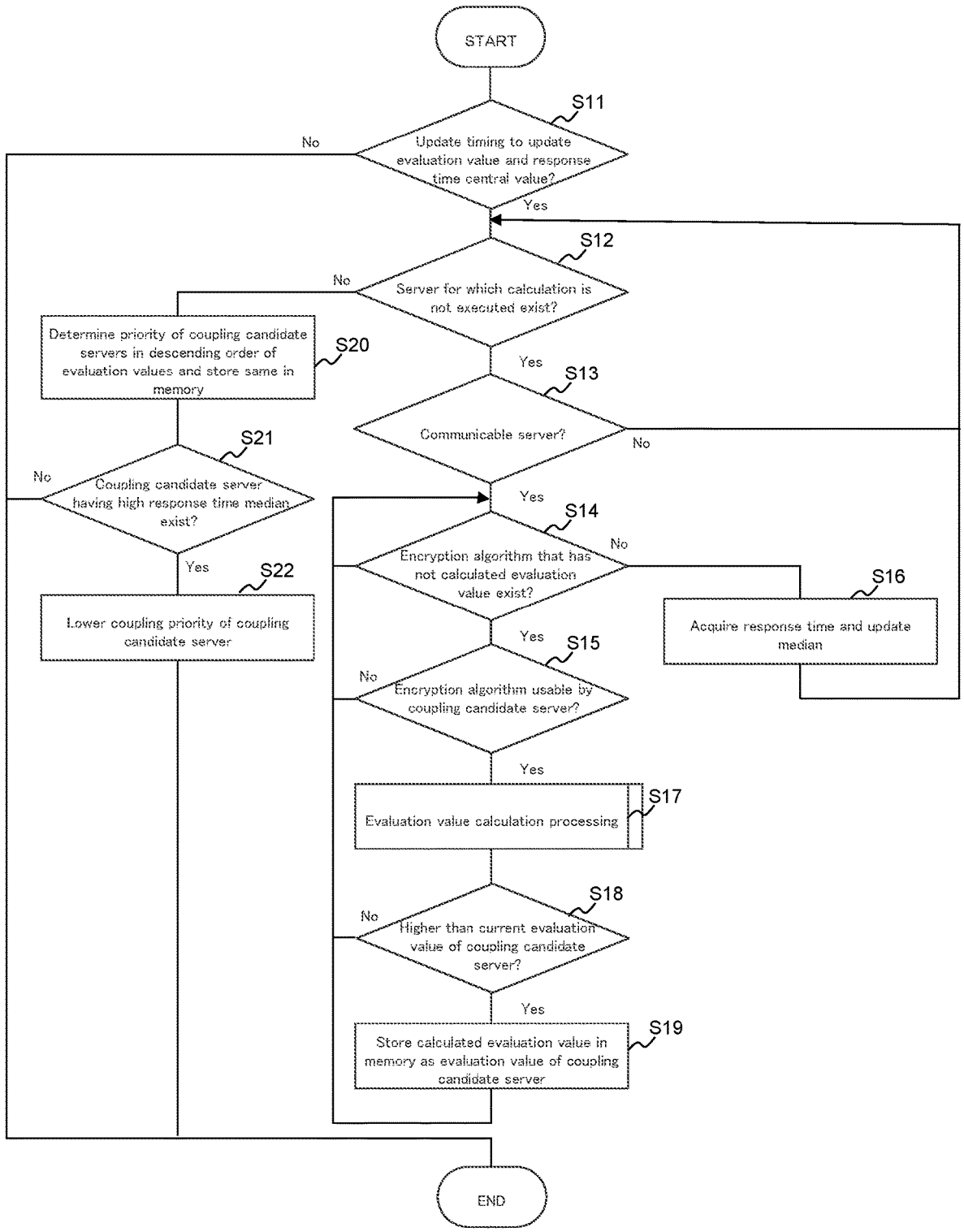
FIG. 6 is a detailed flowchart of the priority calculation processing according to an embodiment.

FIG. 6 is a detailed flowchart of the priority calculation processing according to an embodiment.

First, the acquisition unit 24 of the storage system 10 determines whether an update timing to update the evaluation value and the response time median of a coupling target server has arrived (step S11). The update timing may be, for example, a timing at which a prescribed time has elapsed since the last update timing. Alternatively, the update timing may be a timing at which a coupling candidate server has been added or deleted, a timing at which the security configuration of a coupling candidate server has been changed, a timing at which a security configuration (for example, an encryption algorithm) usable by the storage system 10 has been changed, a timing at which a security configuration used by a user in the storage system 10 has been changed, or the like.

If the update timing has not arrived (No in step S11), the acquisition unit 24 ends the processing.

On the other hand, if the update timing has arrived (Yes in step S11), the acquisition unit 24 acquires security configurations from respective coupling candidate servers, stores the acquired security configurations in the coupling candidate server information tables 31, and performs the processing of steps S12 to S22 for each of the groups of coupling candidate servers that perform the processing of the same kind.

First, the processing unit 23 determines whether a coupling target server (unprocessed server) on which processing (processing of step S13 and the subsequent steps) to calculate an evaluation value has not been performed exists in a group (step S12). If the unprocessed server exists (Yes in step S12), the processing unit 23 determines whether the unprocessed server is a communicable server (step S13).

If the unprocessed server is not a communicable server (No in step S13), the processing unit 23 proceeds the processing to the step S12 since an evaluation value cannot be calculated for the unprocessed server.

On the other hand, if the unprocessed server is a communicable server (Yes in step S13), the processing unit 23 determines whether an encryption algorithm (unprocessed encryption algorithm) that has not performed processing (processing of step S15 and the subsequent steps) to calculate an evaluation value in the unprocessed server exists among encryption algorithms usable by the storage system 10 (step S14).

If the unprocessed encryption algorithm exists (Yes in step S14), the processing unit 23 determines whether the unprocessed encryption algorithm is usable by the unprocessed server (step S15).

On the other hand, if the unprocessed encryption algorithm does not exist (No in step S14), as it means that all the encryption algorithms usable by the storage system 10 have performed the processing to calculate an evaluation value in the unprocessed server, the processing unit 23 measures and acquires the response time of the unprocessed server, updates a response time median (step S16), and proceeds the processing to the step S12.

If the unprocessed encryption algorithm is not usable by the unprocessed server (No in step S15) as a result of step S15, as it is not able to evaluate an evaluation value, the processing unit 23 proceeds the processing to the step S14. On the other hand, if the unprocessed encryption algorithm is usable by the unprocessed server (Yes in step S15), the processing unit 23 performs evaluation value calculation processing (see FIG. 7) to calculate an evaluation value for the unprocessed encryption algorithm in the unprocessed server (step S17). By the evaluation value calculation processing, an evaluation value corresponding to the configured mode is calculated.

Next, the processing unit 23 determines whether the evaluation value calculated by the evaluation value calculation processing is higher than an evaluation value currently stored in the configuration candidate server information table 31 corresponding to the unprocessed server (step S18).

If the calculated evaluation value is not higher than the currently-stored evaluation value (No in step S18), the processing unit 23 proceeds the processing to the step S14. On the other hand, if the calculated evaluation value is higher than the currently-stored evaluation value (Yes in step S18), the processing unit 23 stores the calculated evaluation value in the coupling candidate server information table 31 corresponding to the unprocessed server in the memory 30 (step S19) and proceeds the processing to the step S14.

According to steps S14 to S19 described above, it is possible to store the highest evaluation value in the configured mode in the coupling candidate server information table 31 if a plurality of encryption algorithms usable between the unprocessed server and the storage system 10 are to be used for the unprocessed server.

On the other hand, in step S12, if the unprocessed server on which the processing to calculate an evaluation value has not been performed does not exist (No in step S12), as it means that the processing to calculate an evaluation value for all the unprocessed servers has been performed, the processing unit 23 determines the coupling priority of respective coupling candidate servers in a descending order of their evaluation values for the coupling candidate serves in the same group and stores the determined coupling priority in the coupling candidate server information tables 31 corresponding to the respective coupling candidate servers (step S20).

Next, the processing unit 23 determines whether a coupling candidate server having a high response time median exists among the coupling candidate servers in the same group (step S21). Here, the coupling candidate server having a high response time median may be, for example, a coupling candidate server having a response time median higher than a threshold. The threshold may be a fixed value, a value obtained by multiplying an average of the response time medians of all the coupling candidate servers in the group by a prescribed number, or a value obtained by multiplying the lowest response time medians among the response time medians of the coupling candidate servers in the group by a prescribed number.

If the coupling candidate server having a high response time median does not exist (No in step S21), as it means that the respective coupling candidate servers are enabled to relatively stably perform processing, the processing unit 23 ends the processing.

On the other hand, if the coupling candidate server having the high response time median exists (Yes in step S21), as it means that the coupling candidate server having a high response time median is unstable in performing the processing, the processing unit 23 lowers the coupling priority of the coupling candidate server, stores the lowered coupling priority in the coupling candidate server information table 31 corresponding to the coupling candidate server (step S22), and ends the processing. Here, the processing unit 23 may set the lowest coupling priority in the coupling candidate server when lowering the coupling priority. According to the processing, it is possible to properly reduce a possibility that a coupling candidate server having a high response time median is selected as a coupling destination.

Note that the processing unit 23 performs the processing of steps S12 to S22 on another group when the other group of coupling candidate servers exists. Thus, it is possible to calculate coupling priority for each group such as coupling priority for the group of the key management servers, coupling priority for the group of the external authentication servers, and coupling priority for the group of the Syslog servers.

After performing the priority calculation processing, the processing unit 23 of the storage system 10 refers to the coupling priority of the coupling candidate server information table 31 corresponding to the coupling candidate server of a group that performs the processing when coupling to a coupling candidate server to perform the prescribed processing. Then on the basis of the coupling priority, the processing unit 23 determines a coupling candidate server to which the storage system 10 is to be actually coupled and establishes coupling to the coupling candidate server. Thus, it is possible to properly couple the storage system 10 to a coupling candidate server matching a user's request.

Next, the evaluation value calculation processing (step S17) will be described in detail.

Figure 7:
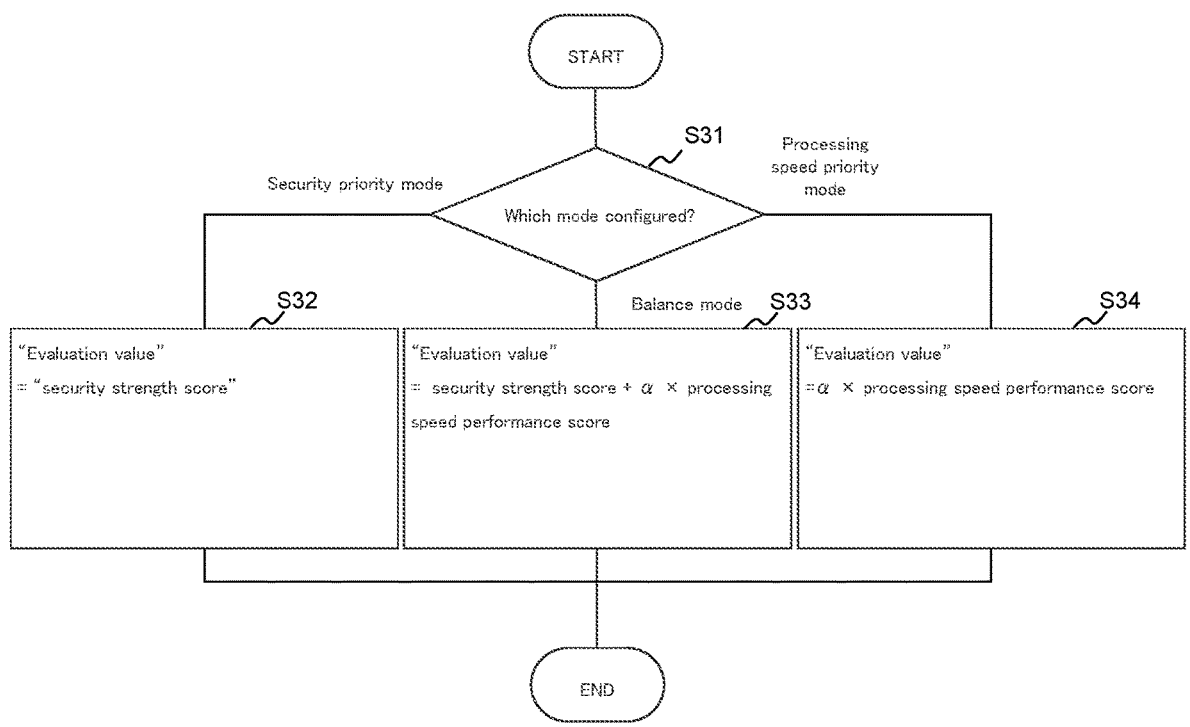
FIG. 7 is a flowchart of evaluation value calculation processing according to an embodiment.

FIG. 7 is a flowchart of the evaluation value calculation processing according to an embodiment.

The processing unit 23 refers to the mode table 33 to specify a configured mode (step S31).

If the security priority mode is configured (security priority mode in step S31), the processing unit 23 determines a security strength score corresponding to the unprocessed encryption algorithm of the security configuration table 32 as an evaluation value (step S32) and ends the processing. If the security priority mode is configured, the coupling priority of a coupling candidate server having a high security strength score is basically determined to be high in the priority calculation processing shown in FIG. 6.

Further, if the balance mode is configured (balance mode in step S31), the processing unit 23 determines a value, which is obtained by adding a value obtained by multiplying a processing speed performance score corresponding to the unprocessed encryption algorithm by a weight α to a security strength score corresponding to the unprocessed encryption algorithm of the security configuration table 32, as an evaluation value (step S33) and ends the processing. Here, the weight α is a value corresponding to a significant configuration for the processing of the unprocessed encryption algorithm of the storage system 10. The weight α is, for example, 1 if the significant configuration does not exist. If the significant configuration exists, the weight α is a value larger than 1 according to the configuration. Here, the significant configuration is a hardware accelerator corresponding to the execution of the unprocessed encryption algorithm, a configuration in which the control unit 20 supports an instruction set dedicated to encryption (for example, AES-NI (Advanced Encryption Standard New Instructions)), a configuration specialized in the processing of other unprocessed encryption algorithms, or the like. By the calculation of an evaluation value with the weight a as described above, it is possible to increase the evaluation value if the unprocessed encryption algorithm has a significant configuration and make the evaluation value appropriate according to the configuration of the storage system 10. If the balance mode is configured, the coupling priority of a coupling candidate server having a high value based on a security strength score and a processing speed performance score is basically determined to be high in the priority calculation mode shown in FIG. 6.

Further, if the processing speed priority mode is configured (processing speed priority mode in step S31), the processing unit 23 determines a value obtained by multiplying a processing speed performance score corresponding to the unprocessed encryption algorithm of the security configuration table 32 by the weight α as an evaluation value (step S34) and ends the processing. If the processing speed priority mode is configured, the coupling priority of a coupling candidate server having a high processing speed performance score is basically determined to be high in the priority calculation mode shown in FIG. 6.

In the evaluation value calculation processing described above, it is possible to change an evaluation value according to a configured mode and calculate an evaluation value corresponding to a situation on which a user places emphasis.

Figure 8:
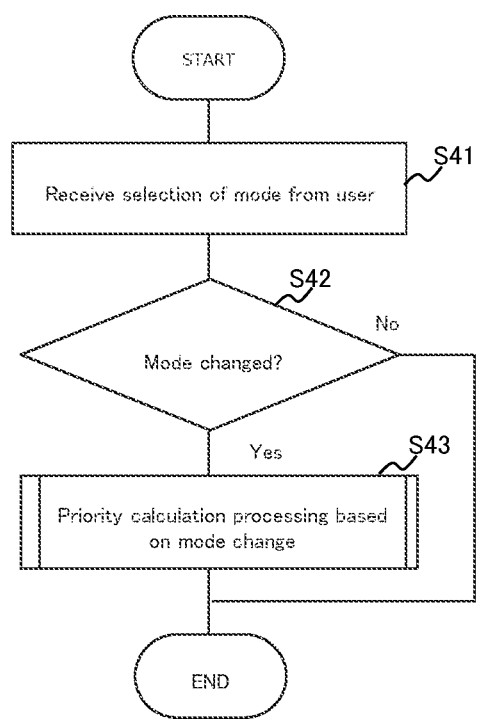
FIG. 8 is a flowchart of priority calculation processing at the time of mode reception according to an embodiment.

FIG. 8 is a flowchart of priority calculation processing at the time of mode reception according to an embodiment.

The priority calculation processing at the time of mode reception is performed when the selection of a mode is received from a user.

For example, when the configuring unit 22 receives the selection of a mode via the management client PC 90 (step S41), the processing unit 23 refers to the mode table 33 to determine whether the mode has been changed (step S42).

If the mode has not been changed (No in step S42), coupling priority remains the same. Therefore, the processing unit 23 ends the processing.

On the other hand, if the mode has been changed (Yes in step S42), as there is a possibility that the coupling priority changes with the mode change, the processing unit 23 performs priority calculation processing based on the mode change (step S43) and ends the processing. Here, the priority calculation processing based on the mode change corresponds to the processing of steps S12 to S22 in the priority calculation processing shown in FIG. 6.

According to the priority calculation processing at the time of mode reception, it is possible to properly change coupling priority to coupling priority adapted to a mode when the mode is selected.

Note that the present invention is not limited to the above embodiments but may be appropriately modified and carried out without departing from its gist.

Figure 9:
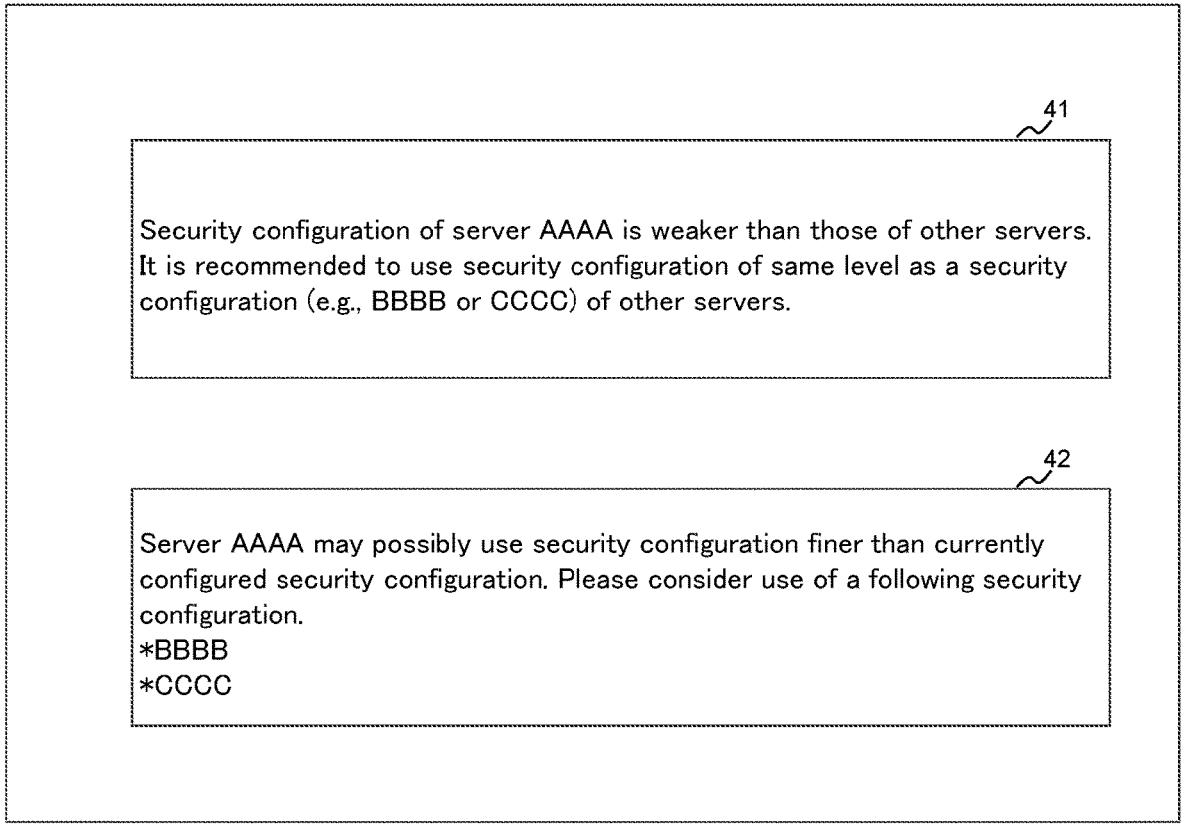
FIG. 9 is a diagram showing a notification information example according to an embodiment.

For example, in the above priority calculation processing, the processing unit 23 stores the security strength scores of respective coupling candidate servers in a group in the memory 30, and for example, if a coupling candidate server having a security strength score equal to or smaller than a prescribed threshold exists or if a coupling candidate server having a security strength score smaller than an average of the security strength scores of coupling candidate servers in the same group by an amount smaller than or equal to a prescribed threshold, the notification unit 21 may notify a user of information indicating the existence of such a coupling candidate server. A method for providing a notification of the information to the user may be, for example, the display of the notification information on the web browser of the management client PC 90 or the transmission of the notification information to an e-mail address of the user. Further, the notification information may be, for example, a content recommending the change of a security configuration or the use of other security configurations like a notification message 41 or a notification message 42 shown in FIG. 9. By providing a notification of information to a user as described above, it is possible to cause the user to properly recognize the configuration error of a server if the configuration error is caused.

Further, in the above embodiments, a score not considering a significant configuration for security processing in the storage system is assumed and adjusted in consideration of the significant configuration in the security configuration table 32. However, the present invention is not limited to this. For example, a score considering the significant configuration in the storage system may be stored in the security configuration table.

Further, in the above embodiments, coupling priority is directly adjusted on the basis of a response time median. However, the present invention is not limited to this. It is also possible to calculate a score (response time score) based on a response time median, calculate an evaluation value for a server on the basis of the security strength score, the processing speed performance score, and the response time score, and determine coupling priority on the basis of the evaluation value.

Further, a part or all of the processing performed by the CPU may in the above embodiments be performed by a hardware circuit. Further, the program in the above embodiments may be installed from a program source. The program source may be a program distribution server or a storage medium (for example, a transportable storage medium).

What is claimed is:

1. A storage system that determines coupling priority for a plurality of coupling candidate servers, the storage system comprising:
 a processor implemented as hardware, wherein
 the processor is configured to:
 acquire information on security strength from the coupling candidate servers;
 determine coupling priority of the respective coupling candidate servers on a basis of the security strength of the coupling candidate servers and processing speed performance in processing relating to security with the coupling candidate servers;
 cause the determined coupling priority of the coupling candidate servers to be stored in a prescribed storage device;
 measure respective response times of the coupling candidate servers and adjust the coupling priority on a basis of the response times;
 measure the respective response times of the coupling candidate servers for a plurality of times;
 determine medians of the response times on a basis of a plurality of the response times;
 adjust the coupling priority on a basis of the medians of the response times; and
 lower the coupling priority of a first coupling candidate server if a median of the response times of the first coupling candidate server is higher than a prescribed threshold calculated on a basis of medians of the response times of other coupling candidate servers.

2. The storage system according to claim 1, wherein the processor is configured to
determine a security strength evaluation value that is an evaluation value relating to the security strength, determine a processing speed performance evaluation value that is an evaluation value relating to the processing speed performance, and determine the coupling priority on a basis of the security strength evaluation value and the processing speed performance evaluation value.

3. The storage system according to claim 2, further comprising:
a storage device configured to store a reference value of a processing speed in processing relating to security corresponding to the security strength, wherein
the processor is configured to
calculate the processing speed performance evaluation value by considering a weight based on a significant configuration against the reference value if the storage system has the significant configuration for the processing relating to the security.

4. The storage system according to claim 2, wherein the processor is configured to
receive specification of one or both of the security strength evaluation value and the processing speed performance evaluation value as specification of an evaluation value used for determining coupling priority from a user, and
determine the coupling priority on a basis of the evaluation value corresponding to the specification by the user.

5. The storage system according to claim 1, wherein the processor is configured to
notify a user of information indicating that security strength of a coupling candidate server is low if the security strength of the coupling candidate server is lower than a prescribed reference.

6. The storage system according to claim 1, wherein the processor is configured to
determine a coupling candidate server as a coupling destination according to the coupling priority if coupling to the coupling candidate server is necessary and establish the coupling to the determined coupling candidate server.

7. The storage system according to claim 1, wherein the processor is configured to
transmit diagnostic data including at least information on the security strength of the coupling candidate servers to a sales system configured to propose a recommendation to the storage system.

8. A coupling priority determination method by a storage system that has a processor and determines coupling priority for a plurality of coupling candidate servers, the coupling priority determination method comprising:

determining coupling priority of the respective coupling candidate servers on a basis of security strength of the coupling candidate servers and processing speed performance in processing relating to security with the coupling candidate servers;
causing the determined coupling priority of the coupling candidate servers to be stored in a prescribed storage device;
measuring respective response times of the coupling candidate servers and adjust the coupling priority on a basis of the response times;
measuring the respective response times of the coupling candidate servers for a plurality of times;
determining medians of the response times on a basis of a plurality of the response times;
adjusting the coupling priority on a basis of the medians of the response times; and
lowering the coupling priority of a first coupling candidate server if a median of the response times of the first coupling candidate server is higher than a prescribed threshold calculated on a basis of medians of the response times of other coupling candidate servers.

9. A non-transitory computer-readable recording medium that records a coupling priority determination program performed by a computer that has a processor and determines coupling priority for a plurality of coupling candidate servers, wherein
the coupling priority determination program causes the computer to:
determine coupling priority of the respective coupling candidate servers on a basis of security strength of the coupling candidate servers and processing speed performance in processing relating to security with the coupling candidate servers; and
store the determined coupling priority of the coupling candidate servers in a prescribed storage device;
measure respective response times of the coupling candidate servers and adjust the coupling priority on a basis of the response times;
measure the respective response times of the coupling candidate servers for a plurality of times;
determine medians of the response times on a basis of a plurality of the response times;
adjust the coupling priority on a basis of the medians of the response times; and
lower the coupling priority of a first coupling candidate server if a median of the response times of the first coupling candidate server is higher than a prescribed threshold calculated on a basis of medians of the response times of other coupling candidate servers.

\* \* \* \* \*